(No Model.)
C. H. WOODBURY.
CLUTCH FOR CARD FEEDING MACHINES.
No. 571,963. Patented Nov. 24, 1896.
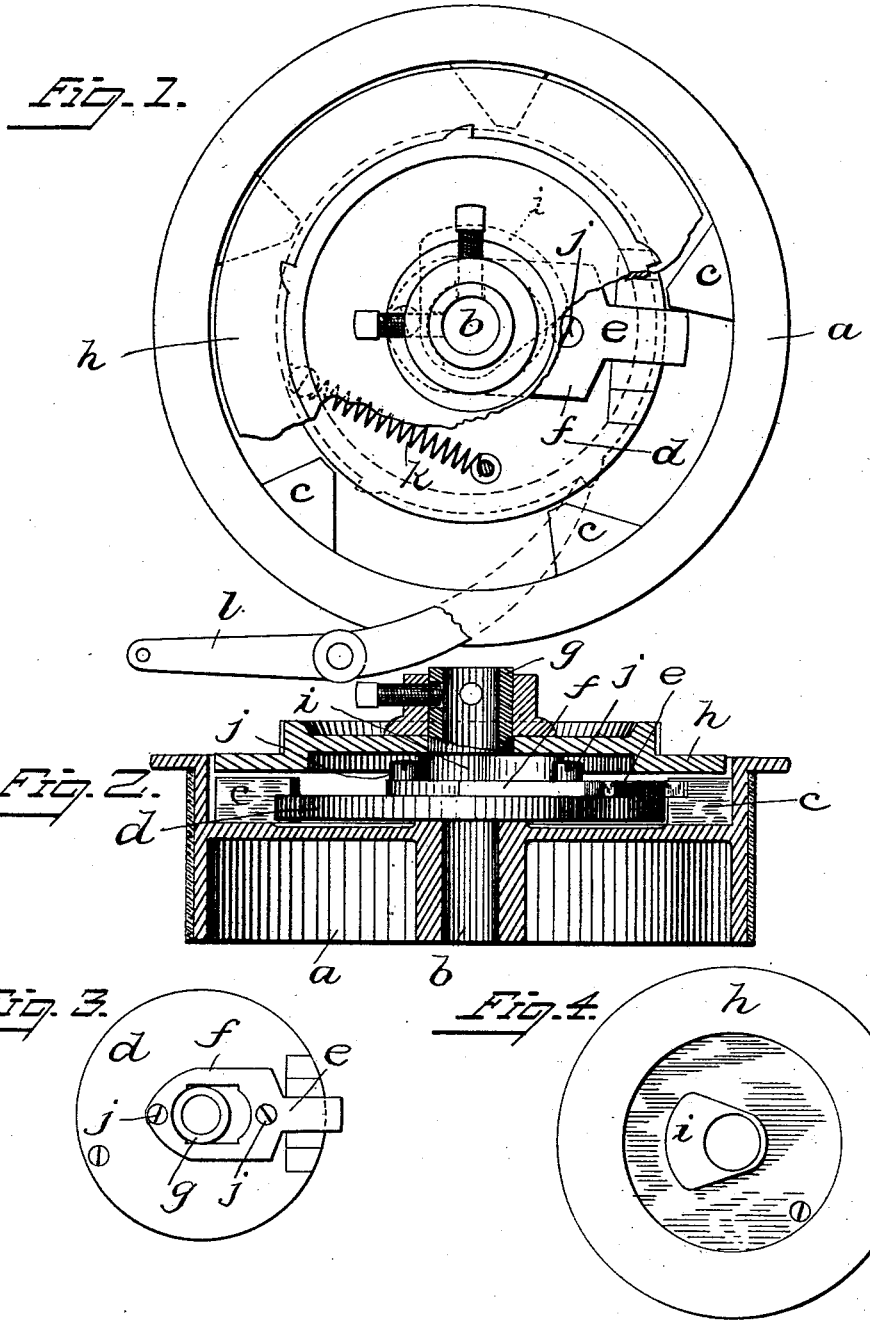
WITNESSES
Otis Lindquist.
C. C. Stecher.
INVENTOR
Chas H Woodbury
by A W Crossley
att.

UNITED STATES PATENT OFFICE.

CHARLES H. WOODBURY, OF FRANKLIN, MASSACHUSETTS.

CLUTCH FOR CARD-FEEDING MACHINES.

SPECIFICATION forming part of Letters Patent No. 571,963, dated November 24, 1896.

Application filed April 23, 1896. Serial No. 588,713. (No model.)

*To all whom it may concern:*

Be it known that I, CHARLES H. WOODBURY, of Franklin, in the State of Massachusetts, have invented certain new and useful Improvements in Clutches for Card-Feeding Machines, of which the following is a description sufficiently full, clear, and exact to enable those skilled in the art to which it appertains or with which it is most nearly connected to make and use the same.

This invention has relation to clutches generally, and particularly to that kind or class that are adapted to be used on so-called "Bramwell" card-feeding machines in governing or controlling the operation of the spike or lifting-apron relatively to the operation of the scales for weighing the stock.

It is essential in order to secure perfect and even work in the use of card-feeding machines that the spike or supply apron should be stopped the moment the scale-pans receive their complement of wool. If the apron is not so stopped, a superfluous amount of stock will be carried over into the pans of the scale, resulting in uneven feed.

To obviate the objections mentioned, quickly-operating clutches are desirable to connect and disconnect the apron-operating shaft to and from the driving means, and it is to accomplish this end that my improvements have been devised, having in view also the points of simplicity of construction, certainty of operation, and the avoidance of undue shock or jar to the machine in the use of the device.

The nature or character and mode of operation of my improvements, as well as the scope of my invention, will now be set forth and pointed out.

Reference is to be had to the annexed drawings, and to the letters marked thereon, forming a part of this specification, the same letters designating the same parts or features, as the case may be, wherever they occur.

Of the drawings, Figure 1 is a face view of a clutch for card-feeding machines embodying my invention, parts being shown as broken away the better to illustrate the actual improvements. Fig. 2 is a longitudinal central sectional view of the same, some of the parts, however, being shown as in elevation. Fig. 3 is a face view of the latch or dog carrying disk, the latch being shown in place. Fig. 4 is an inner face view of the trip-latch-operated ratchet-disk equipped with means for operating the latch or dog shown in Fig. 3.

In the drawings, $a$ designates a driven pulley (though it might as well be a toothed gear or equivalent device) which is centrally provided with an aperture $b$ to enable it to be placed upon the shaft which carries and actuates the spike or supply apron and to run loosely upon the said shaft.

One side of the pulley $a$ is provided with an annular chamber, projecting inwardly from the outer walls of which are a series of blocks, stops, or teeth $c$, suitably formed, and which may be an integral part of the pulley or be fixed thereon.

$d$ is a disk adapted to be secured to the apron-shaft, so as to turn in unison therewith. This disk is arranged in the annular chamber of the pulley $a$ and within the inner ends of stops or teeth $c$.

On the outer face of the disk $d$ there is arranged a radially-sliding latch or dog $e$, provided at its inner end or part with a yoke-like device $f$, arranged to embrace the apron-shaft and guided and held in place at its outer end by means connected with the said disk.

The last-mentioned device is provided with a sleeve $g$, upon which the trip-latch ratchet-disk $h$ is loosely arranged, and is provided on its inner face with a cam $i$, which is adapted to operate between two pins or projections $j\,j$, extending outward from the yoke-like part of the latch or dog $e$ on opposite sides of the apron-shaft. A spring $k$ is connected with the ratchet-disk $h$ and other suitable part of the device, so as to move and hold the said disk back in a position which will cause the cam $i$ to act upon the pins or projections $j$ in such manner as to move and hold the latch $e$ projected normally outward, as is clearly shown in Figs. 1 and 3. When, however, the disk $d$ is moved around against the tension or stress of the spring $k$, the cam $i$ will act upon the pins or projections $j$ of the latch or dog $e$ in such manner as to move the latter inward. When the latch or dog is in its outward position, it will engage the stops $c$, and when it is moved inward it will clear the same.

$l$ is the trip-latch of common function and having the usual relationship to the ratchet-disk $h$, so that it need not be further described herein.

In the use of my invention when the machine is running and the apron is being operated to fill the scale-pans the disk $h$ will be held back in normal position by the spring $k$, the dog $e$ will be projected to engage one of the stops $c$ by the action of the cam $i$, and the pulley $a$ will be clutched, as it were, with the apron-shaft, it being understood, of course, that the trip-latch will be held out of engagement with the teeth of the trip-latch disk $h$. The moment the scale-pans become filled the trip-latch will be operated, so as to engage one of the teeth of the disk $h$ and move it, as it were, forward against the tension of the spring $k$, causing the latch or dog $e$ to be drawn inward and disengaged from the stops or teeth $c$, and so effect an unclutching of the pulley $a$ from the apron-shaft, instantly stopping the operation of the latter. As soon as the trip-latch $l$ is again moved out of engagement with the ratchet-disk $h$ the spring $k$ will act to restore the parts to what, for the purposes of this specification, I have called their "normal" position.

It will be noted that by my improved manner of mounting and supporting the latch or dog $e$ it is always kept in exact position, not liable to breakage or displacement, and is adapted to be actuated with the utmost certainty and ease.

The structure as a whole is adapted to be made strong, and so as not to be disorganized with readiness or in the ordinary use of the machine.

Of course the pulley $a$ may be provided with as many stops or blocks $c$ and the trip-latch disk $h$ may have as many teeth as circumstances may suggest.

Instead of the pins $j$, the latch or dog $e$ may be provided with antifriction-rollers or the like at this point.

Other changes of form may be made in parts of my invention without departing from the nature or spirit of the improvements.

Having thus explained the nature of the invention and described a way of constructing and using the same, though without attempting to set forth all of the forms in which it may be made or all of the modes of its use, it is declared that what is claimed is—

1. A clutch for card-feeding machines, comprising in its construction a driving member having inwardly-projecting stops; a driven member, equipped with a radially-movable latch or dog, the inner part of which is made in yoke form and the outer end of which is guided by the said driven member; pins or projections on the yoke part of the latch or dog; the trip-latch ratchet-disk provided with a cam to operate between the said pins or projections; and a spring to move the trip-latch disk in one direction, as set forth.

2. A clutch for a card-feeding machine, comprising in its construction a driving member, having inwardly-projecting stops; a driven member equipped with a radially-movable latch or dog held against sidewise movement by guides on the driven member; two pins or projections on the inner part of said dog; a ratchet-disk having a cam to operate between said pins or projections; and a spring to move the disk in one direction.

In testimony whereof I have signed my name to this specification, in the presence of two subscribing witnesses, this 18th day of April, A. D. 1896.

CHARLES H. WOODBURY.

Witnesses:
MARCUS B. MAY,
C. C. STECHER.